(No Model.)

L. ROBBINS.
PORTABLE HOUSE FOR SHEEP.

No. 291,625.        Patented Jan. 8, 1884.

WITNESSES
Morton Toulmin
M. J. Maloney

INVENTOR
Lewis Robbins.
N. W. Fitzgerald & Co
ATTORNEY

UNITED STATES PATENT OFFICE.

LEWIS ROBBINS, OF PARKERSBURG, WEST VIRGINIA.

PORTABLE HOUSE FOR SHEEP.

SPECIFICATION forming part of Letters Patent No. 291,625, dated January 8, 1884.

Application filed April 17, 1883. (No model.)

*To all whom it may concern:*

Be it known that I, LEWIS ROBBINS, a citizen of the United States, residing at Parkersburg, in the county of Wood and State of West Virginia, have invented certain new and useful Improvements in Portable Houses for Sheep; and I do hereby declare the following to be a full, clear, and exact description of the invention, such as will enable others skilled in the art to which it appertains to make and use the same.

This invention relates to improvements in portable houses for sheep, and has for its object to furnish a shelter which can be easily transported from one part of a field to another, furnish security from other animals, and provide facilities for feeding purposes. These objects are attained by the devices illustrated in the accompanying drawings, forming a part of this specification, in which—

Figure 1:
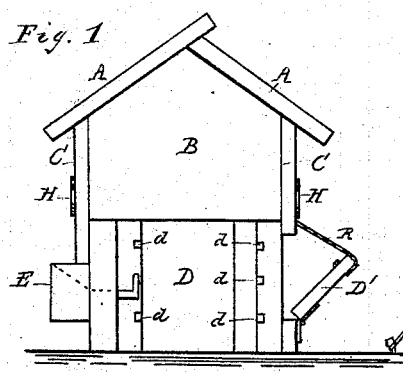
Figure 2:
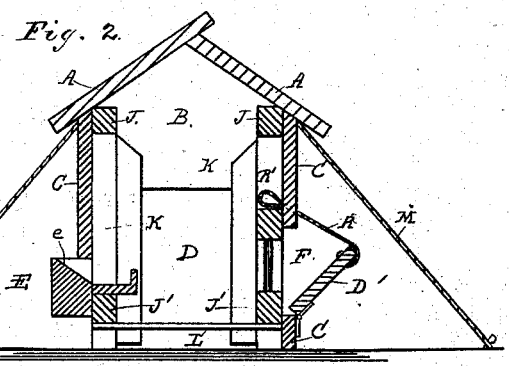
Figure 3:
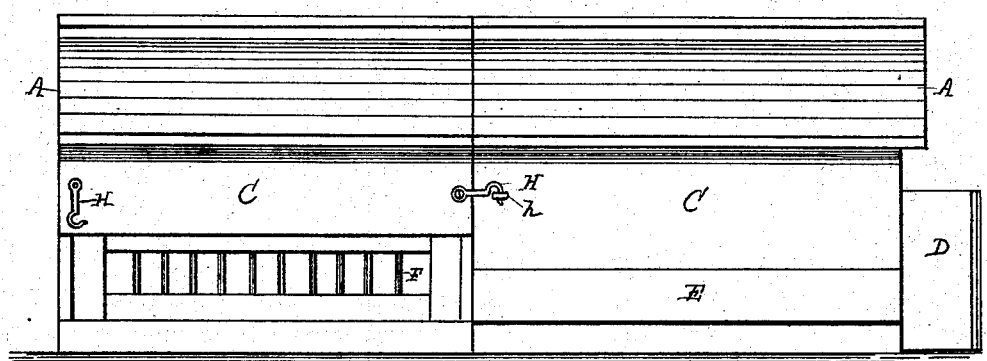

Figure 1 is an end elevation. Fig. 2 is a transverse section; Fig. 3, a side elevation, showing two of the houses or sections coupled together.

The letter A represents the roof; C, the siding; B, the covering of the ends of the sections; D, a door; D', a shutter; E, a feeding-trough; F, slats; R, a cord; R', a loop in the end of cord R. The loop R' is intended to pass over a hook or other projection within the building, for the purpose of securing the shutter F when shut, and to limit the extent of the opening (when open) by resting against the holes in the siding C, the holes being of a size to permit the passage of the rope, but too small for the loop.

J K represent the framing of the house; L, a transverse brace; *d d*, notches in one end of the house, in which bars may be inserted to close the opening.

H are hooks; *h*, eyes by which the sections are joined and secured to each other.

M are guy-ropes secured under the eaves in the center of each section, to prevent blowing over.

I prefer to make each section six feet high, six wide, and twelve feet long; but the builder can suit his own convenience in this matter.

I propose to make the frames J J' K of two-by-four-inch scantling, halved together, and bolted with light two-inch bolts. To these the ends B and siding C are attached.

The shutters D' are hinged to the siding C at the bottom, and when open hang at an incline of about forty-five degrees, and are maintained in this position by the cords R, the inner ends of which are formed into loops R', and are passed through holes in the siding C, while the outer ends are secured to the shutters D'. When the shutters D' are open, the space between the shutters and the slats F may be filled with hay or fodder for feeding purposes.

The trough E extends the whole length of each section, and has an inclined opening, *e*, accessible from the outside of the house, into which grain or other feed may be introduced. These houses will prove exceedingly useful in protecting the sheep from dogs or other animals, and, being lightly constructed, may be easily carried from one part of a field to another every night, and thus present a clean space for the sheep, as well as to separate any parts of the flock for fattening or other purposes.

Having described my invention, what I desire to secure by Letters Patent and to claim is—

A sheep-house having framing J J' K, roof A, ends B, sidings C, and slats F, and provided with hinged shutter D', to which is attached cord R, having loop R', substantially as described.

In testimony whereof I affix my signature in presence of two witnesses.

LEWIS ROBBINS.

Witnesses:
R. HEBER SMITH,
TH. G. SMITH.